United States Patent Office
3,546,267
Patented Dec. 8, 1970

3,546,267
PRODUCTION OF HALOGENATED
PHENOXYSILANES
Roshdy Ismail, Spich, Germany, assignor to Dynamit
Nobel Aktiengesellschaft, Troisdorf, Germany, a corporation of Germany
No Drawing. Continuation-in-part of application Ser. No. 601,288, Dec. 7, 1966. This application July 1, 1969, Ser. No. 838,333
Claims priority, application Germany, July 9, 1968, 1,768,863; Dec. 7, 1965, D 48,848
Int. Cl. C07f 7/06, 7/18
U.S. Cl. 260—448.8    18 Claims

ABSTRACT OF THE DISCLOSURE

Halogenated phenoxysilanes of the formula:

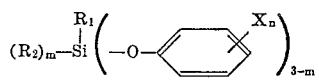

wherein $R_1$ is alkenyl, alkyl, cycloalkyl or aryl, $R_2$ is alkyl, cycloalkyl, aryl, alkoxy or aryloxy, X is fluorine, chlorine or bromine and $n$ is a whole number of from 1 to 5 and $m$ is 0 or 1 and process of preparing the same comprising condensing at a temperature of from 40 to 250° C. a halogenated phenol of the formula:

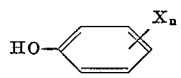

with a halogen silane of the formula:

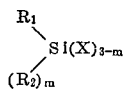

wherein $R_1$, $R_2$, X, $n$ and $m$ are as above defined in the presence of at least one member of the group consisting of tertiary amines, the amino group of which may be a component of an aromatic ring system, N-mono- and disubstituted and unsubstituted acid amides, or a hydrochloride thereof.

---

This application is a continuation-in-part of application Ser. No. 601,288, filed Dec. 7, 1966, now abandoned.

The present invention relates to a process for the production of halogenated phenoxysilanes which are valuable as water repellants, sizing agents, fire retardants, fungicides, bactericides, insecticides, etc.

More particularly, this invention relates to a process for the production of halogenated phenoxysilanes of the formula:

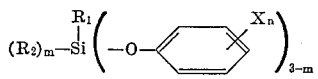

wherein $R_1$ represents alkenyl, alkyl, cycloalkyl or aryl, $R_2$ represents alkyl, cycloalkyl, aryl, alkoxy or aryloxy, X represents fluorine, chlorine or bromine, and $n$ is a whole number of from 1 to 5 and $m$ is 0 or 1.

Attempts have already been made to manufacture halogenated phenoxysilanes. One such procedure is the reaction of the corresponding sodium phenolates with halogen silanes in xylene and is described in J. Org. Chemistry 25 (1965), pp. 1645–1648. In this manner for the first time the phenoxysilanes of pentachlorophenol and of 2,4,6-trichlorophenol were obtained in yields of about 60%. The disadvantages of this process, in addition to the low yields obtained, is the unavoidable use of metallic sodium in order to obtain the sodium phenolates in the necessary high purity, and the production of large amounts of by-products, including inorganic salts. The latter considerably complicates the separation of the pure halogenated phenoxysilanes, particularly because of their poor solubility and their tendency to undergo hydrolysis. As a result, this process has not proved satisfactory for industrial production.

Other processes for the production of phenoxysilanes are known. For example, it is conventional to produce special phenoxysilanes from readily accessible esters, e.g., from ethoxysilanes, by way of re-esterification, in the presence, if desired, of acid or alkaline catalysts such as p-toluenesulfonic acid.

It has developed, however, that this process cannot be applied to the manufacture of organo-halogen phenoxysilanes of halogenated phenols. If, for example, an attempt is made to react such phenols with organo-organoxysilanes in the fused state or in solution, with or without a catalyst, it is observed that the condensation at first commences very slowly and finally comes to a half before the desired phenoxysilanes have fully developed.

Another of the processes for the synthesis of phenoxysilanes which have been proposed is the direct condensation of halogensilane with phenol, in the presence of, or absence of, solvent, with the release of gaseous HCl. However, on attempting to react halogenated phenols by this process, it is again observed that the condensation again proceeds very slowly and is incomplete, coming to a stop before the desired phenoxysilanes have developed. This reaction can be carried out in the presence of excess or stoichiometric amounts of amines, the amines acting as HCl acceptors. Furthermore, a certain catalytic action is ascribed to the amines, which consists in their forming Lewis acid complex compounds with the halogen silane. However, even in the presence of excess or stoichiometric amounts of an amine, such as pyridine, halogenated phenols do not form phenoxysilanes in this reaction, but, due to their unusually high acidity, they form ammonium salts which are then unsuitable for the formation of phenoxysilane.

It has now been surprisingly found that the previously described difficulties in the manufacture of halogenated phenoxysilanes of the formula:

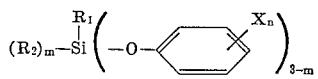

wherein $R_1$ is alkenyl, alkyl, cycloalkyl or aryl, $R_2$ is alkyl, cycloalkyl, aryl, alkoxy or aryloxy, X is fluorine, chlorine or bromine, and $n$ is a whole number of from 1 to 5 and $m$ is 0 or 1 can be avoided if halogenated phenols of the formula:

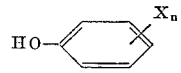

are condensed with a halogensilane of the formula:

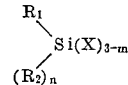

wherein $R_1$, $R_2$, X, $m$ and $n$ have the same meaning as above in the presence of at least one member of the group consisting of tertiary amines, the amino group of which may be a component of an aromatic ring system, N-mono- and disubstituted an unsubstituted acid amides, or a hydrochloride thereof, the condensation being effected at a temperature of 40 to 250° C., and preferably of 55 to 180° C., possibly under use of a solvent.

The reaction of the present invention is preferably carried out at normal pressure, although an excess pressure of up to 12 atmospheres can be used. The use of higher pressures, however, offers no important advantages over the pressureless procedure when effected in the presence of the tertiary amine, the amino group of which is part of an aromatic ring system, unsubstituted, N-mono- or disubstituted acid amide or their hydrochlorides.

This reaction can be carried out both in the molten state and in the presence of solvents. Suitable solvents within the meaning of the present invention include the aliphatic, chlorinated aliphatic, aromatic and chlorinated aromatic hydrocarbons, as well as simple and cyclic ethers. Illustrative aliphatic hydrocarbons include both homogeneous compounds and mixtures of the same, as for instance, iso-octane and gasoline fractions, such as for example, those fractions having a boiling range of from 120 to 180° C. Benzene, toluene, isomeric mixtures of hexylcumene, cyclohexyltoluene, cyclohexylethylbenzene, isopropylethylbenzene, dihexylbenzene, di-p-tolylmethane, nitrobenzene and xylene are examples of aromatic hydrocarbons suitable for use as solvents. Suitable chlorinated aliphatic and aromatic hydrocarbons include tetrachloroethane, tetrachloroethylene, pentachloroethane, trichlorobenzene, dichloroethylbenzene, etc. Instances of ethers which are suitable for use in the reaction include diisopropylether, diisoamylether, diphenylether, 1,4-dioxane, etc. From the above listing of suitable ethers, it can be seen that both aliphatic and aromatic open-chained ethers can be used.

Suitable starting products for use in the carrying out of the process of the invention are the halogenated phenols having the previously mentioned formula as above set out. There are included therein for example, the fluorinated phenols such as 4-fluorophenol and pentafluorophenol, the chlorinated phenols such as 2-, 3- and 4-chlorophenol, 2,3-, 2,4-, 2,5-, 2,6-, 3,4- and 3,5-dichlorophenol, 2,3,5-, 2,4,5- and 2,4,6-trichlorophenol, 2,3,4,6-tetrachlorphenol and pentachlorophenol and the brominated phenols such as 2-, 3-, and 4-bromophenol, 2,4- and 2,6-dibromophenol, 2,4,6-tribromophenol and pentabromophenol. In addition, mixtures of the aforementioned halogenated phenols with one another and mixtures thereof with other hydroxy compounds (alcohols or halogen-free phenolic compounds) can be used in the manufacture of the phenoxysilanes according to the invention.

The halogen silanes that can be used as a starting material according to the invention correspond to the following formula:

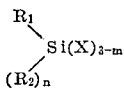

In the above formula, $R_1$ represents an alkenyl radical, as for example, vinyl, allyl, and the like, a stragiht or branched alkyl radical such as methyl, ethyl, i-propyl, n-propyl, n-dodecyl, n-octadecyl, etc., a cycloalkyl radical such as cyclopentyl, cyclohexyl, etc., or an aryl radical, such as phenyl or naphthyl, etc.; $R_2$ represents an alkyl, cycloalkyl or aryl radical as just set out in connection with $R_1$, or an alkoxy radical such as benzyloxy and the like or an aryloxy radical which may be alkyl-substituted as, for example, phenoxy, $\alpha$- and $\beta$-naphthoxy and p-tert-butylphenoxy, and the like, X represents fluorine, chlorine or bromine, and $m$ is 0 or 1.

Typical illustrations of the above classes of materials are, for example: vinyl trichlorosilane, vinyl tribromosilane, allyl trichlorosilane, allyl tribromosilane, methyl vinyl chlorosilane, n-decyl trichlorosilane, phenyl trichlorosilane, diphenyl dichlorosilane, etc.

In preparing the halogenated phenoxysilanes, the halogen silanes and halogenated phenols are employed, preferably in a stoichiometric ratio, i.e., 1 mol of halogenated phenol is used per mol of the halogen silane. The yields of halogenated phenoxysilanes obtained can be improved by the use of and excess of the phenolic compound.

Homogeneous and mixed tertiary amines containing aliphatic, cycloaliphatic and aromatic radicals, tertiary amines, the amino group of which is part of an aromatic ring system, unsubstituted, N-mono- and disubstituted acid amides, or mixtures of such amines and/or amides are suitable for use in carrying out the process according to the invention.

Suitable tertiary amines having aliphatic radicals include for example: trimethylamine, triethylamine, triisopropylamine, triisobutylamine, monoethyldiisopropylamine, monoethyl-di-n-butylamine, tri-n-butylamine, N,N,N',N' - tetramethylbutanediamine - (1,3),N,N,N',N'-tetramethylethylenediamine, and such having chlorine and cyano groups as substituents, such as $\beta$-chloropropyldiisopropylamine, tris-($\beta$-chloroethyl)-amine, N,N,di-n-butylaminoacetonitrile, N,N-diisopropylaminoacetonitrile, N-n-butyl-N-methylaminoacetonitrile and the like. An example of the class of amines containing cycloaliphatic radicals is dimethylcyclohexylamine.

Still further suitable amines include those which have aromatic radicals, such as N,N-dialkylaniline, N,N-dimethylaniline and N,N-diethylaniline and others, p-bromophenyldimethylamine, 2,4-dinitrophenyldimethylamine, benzyldimethylamine, p-nitrophenyl-di-n-butylamine, 2,4-dichlorophenyldiethylamine and N,N,N',N'-tetramethylbenzidine. The aliphatic aromatic amines are especially suited for carrying out the instant process under normal pressure.

Also suitable are heterocyclic amines, such as N-n-butylmorpholine, N-phenylmorpholine, N-(4-methylphenyl)-morpholine, morpholinacetic acid morpholide, N,N-dialkyl and N,N-diarylpiperazines, di-n-butylpiperazine, N,N-diphenylpiperazine, N-alkyl and N-arylquinolines, N-n-propyltetrahydroquinoline, N-phenyltetrahydroquinoline N-alkyl and N-aryl-n-pyrrolidines, N-methylpyrrolidine, N-n-butylpyrrolidine, N-phenylpyrrolidine and the like.

Suitable aromatic tertiary amines for use in accordance with the invention include amines in which the amino group is a component of one or more five-membered rings or of one or more six-membered rings. Tertiary amines having common five-membered and six-membered rings can also be used according to the invention. Alkyl-substituted or halogen-substituted compounds of these amines are also suitable, as are rings with various hetero atoms such as oxygen or sulfur. Instances of such amines are: quinoline, isoquinoline, pyrazine, oxazine, oxazole, thiazole, oxadiazole, benzothiazole, nicotine, and the like.

Illustrative N-mono- or disubstituted or unsubstituted acid amides include the carboxylic acid amides of monobasic aliphatic, aromatic and araliphatic carboxylic acids having 1 to 18 carbon atoms. As monobasic acids, there may be mentioned formic acid, acetic acid, propionic acid, butyric acid, capronic acid, 2-ethylhexanic acid, caprylic acid, lauric acid, palmitic acid, stearic acid, benzoic acid, phenylacetic acid and phenylbutyric acid. The monobasic acids can be straight-chained or branched and can also be interrupted in the alkyl chain by a keto group, as in the case of benzoracemic acid, acetoacetic acid or levulinic acid.

Ammonia or mono- or diamines are suitable as the base component of the acid amides as herein involved. Primary or secondary mono- or diamines are preferred as the amine component, which are derived from the saturated, aliphatic, araliphatic, or cycloaliphatic series, or from the aromatic series having only one aromatic ring. Examples of suitable amines include methylamine, dimethylamine di-n- and di-i-propylamine, di-n- and di-isobutylamine, di-2-methylhexylamine, di-laurylamine, ethylenediamine, tetramethylenediamine, hexamethylenediamine, cyclohexylamine, dicyclohexylamine, benzylamine, dibenzylamine, aniline, N-methylaniline, toluidine, phenylenediamine and hexahydrophenylenediamine. One or both of the alkyl groups present in the amines can be replaced or substituted by the phenyl or toluyl radical or by cycloalkyl groups having 5 to 6 carbon atoms in their rings, which groups may be substituted, by alkyl groups, particularly one or two methyl groups. Of the diamines that are particularly suitable as amino components for the preparation of the acid amides there may be mentioned in particular those diamines in which the two amino groups are separated by one to eight methylene groups.

In the diamines, all but one of the hydrogen atoms still bonded to the nitrogen atom can be substiuted, for example by alkyl groups having 1 to 4 carbon atoms, by phenyl, toluyl, or cycloalkyl radical containing 5 to 6 carbon atoms. The following are examples of carboxylic acid amides which can be used particularly advantageously as catalysts in accordance with the invention: methylformamide, N,N-dimethylyacetamide, N,N-di-n- and N,N-di-i-propylbutyramide, N,N-di-n- or N,N-di-isobutylbutyramide, N-benzylbutyric acid amide, N,N-dipropyl-2-ethylhexanic acid amide, acetoacetic acid-N,N-di-n-butylamide, acetoacetic acid anilide, benzylic acid benzylamide, N,N-dimethylbenzoic acid amide, and N,N-diformylhexamethylenediamine. Cyclic acid amides or imides, such as succinimide, can also be used. Barbituric acids can also be used as catalysts, which acids can also be substituted by hydrocarbon radicals, preferably by $C_1$ to $C_4$ alkyl or phenyl groups. Examples of such acids include dimethylbarbituric acid, diethylbarbituric acid, di-i-propylbarbituric acid, diallylbarbituric acid, di-n-butylbarbituric acid and phenylethylbarbituric acid.

In addition, carbonic acid amides and imides can also be used and preferably the N-substituted derivatives, such as N-phenylurethane, diphenylcarbodiimide and diphenylguanidine.

Sulfonamides are also suitable for use as catalysts. Examples of such sulfonamide catalysts include 4-sulfamoylacetaniline, N'-amidinosulfanilamide, and N'-2-pyridylsulfanilamide.

Phosphorus acid amides, such as N,N,N',N',N'',N''-hexamethylphosphorous acidtriamide, N,N,N',N',N'',N''-hexamethylphosphoric acid triamide, N,N,N',N',N'',N''-hexa-n- and -isobutylphosphorus acid triamide, and phosphorous acid trimorpholide are also suitable catalysts. The phosphoric acid triamides, can also be used as catalysts but are somewhat inferior to phosphorous acid, in their catalytic action.

Titanic acid amides and stannic acid amides, such as di-n-propoxy titanium diamide and di-n- or di-isobutyl tin diamide, can also be used as catalysts in accordance with the invention. The amides of silicic acid and their derivatives known as silazanes, as for example, diphenyl-di-(dibutylamino)-silane, dimethyl-di-(dipropylamino) silane, and phenyl-tri-(dibutylamino)-silane can also be advantageously employed.

It is not necessary to use the already prepared amides as catalysts. Instead, it is possible to use the components from which they are formed, for insatnce, a mixture of a primary or secondary monoamine or diamine of the type described above, and an anhydride or acid chloride of the above-mentioned monocarboxylic acids. Under the conditions of the reaction required for the formation of the silicon esters the acid amides will also be formed. It is also possible in accordance with the invention to use mixtures containing tertiary amines or their quaternary ammonium salts, such as trimethylbenzylammonium chloride, triethylbenzylammonium hydroxide or acetate, or triethylammonium hydrochloride.

The tertiary amines and acid amides used as catalysts are used in quantities of 0.1 to 20 mol-percent, preferably 0.2 to 2 mols, with reference to the halogen silane. They can be added to the reaction batches all at once or in a plurality of small portions.

Under the conditions according to the invention, the condensation takes place rapidly with the release of practically stoichiometric amounts of gaseous HCl.

The above silanes can be used as water-repellants, parting agents, sizing agents for glass fiber fabrics and as surface-improving agents because of their fire-retarding, fungicidal, phytotoxic, bactericidal and, to some extent, insecticidal properties.

In order that the invention may be more fully understood, reference should be had to the following specific examples in which are disclosed processes coming within the scope of the present invention. It will be understood that these examples are given for illustrative purposes merely and are not intended as limitations of the invention:

EXAMPLE 1

Vinyl-tri-(pentachlorophenoxy)-silane

There were dissolved in a three-necked flask provided with a condenser, agitator and tube for the introduction of nitrogen, 79.95 g. (0.3 mol) of pentachlorophenol at 80° C. in 300 ml. of benzene. Thereafter, 16.5 g. (0.1 mol) of vinyltrichlorosilane and 0.4 ml. of N,N-dimethylaniline were added to the resulting solution. The HCl gas that was evolved was flushed out of the reaction mixture with nitrogen gas. The reaction was completed after about 8 hours. The benzene was then drawn off and the end product recrystallized out of toluene. The yield amounted to approximately 80%. The white, crystalline product polymerized when heated. Melting point 188° C.

*Analysis.*—Found (percent): Si, 3.15. Theoretical (percent): Si, 3.29.

EXAMPLE 2

Methylvinyl-di-(2,4,6-trichlorophenoxy)-silane

In a three necked flask equipped with a condenser, agitator and tube for the introduction of nitrogen gas, 25.3 g. (0.2 mol) of pentachlorophenol were dissolved at 80° C. in 200 ml. of benzene. 14.1 g. (0.1 mol) of methylvinyldichlorosilane and 0.5 ml. of N,N-dimethylaniline were then added to the solution. An intense evolution of HCl began immediately. The HCl gas was flushed out of the reaction mixture with nitrogen gas. The reaction was completed after about 8 hours. Then the benzene was drawn off and the end product was distilled out under vacuum. The yield amounted to approximately 80%. The boiling point of the methyl vinyl-di-(2,4,6-trichlorophenoxy)-silane was 204–210° C. at 1.0 mm. Hg.

EXAMPLE 3

Methylvinyl-di-(pentachlorophenoxy)-silane

In a three necked flask equipped with a condenser, agitator and a tube for the introduction of nitrogen, 53.3 g. (0.2 mol) of pentachlorophenol were dissolved in 200 ml. of benzene at 80° C. 14.1 g. (0.1 mol) of methylvinyldichlorosilane and 0.4 ml. of N,N-dimethylaniline were then added. A strong evolution of HCl immediately took place. The HCl gas was flushed out of the reaction mixture with nitrogen. The reaction was ended after about 8 hours. The benzene was withdrawn and the end product was recrystallized out of toluene. The yield amounted to approximately 80%. The white, crystalline raw product had a melting point of 111 to 127° C. and after recrystallization it had a melting point of 128° C.

EXAMPLE 4 n-Decyl-tri-(pentachlorophenoxy)-silane

In a three necked flask equipped with a condenser, an agitator and a tube for the introduction of nitrogen, 79.95 g. (0.3 mol) of pentachlorophenol were dissolved in 350 ml. of toluene at 120° C. Then 27.5 g. (0.1 mol) of n-decyltrichlorosilane and 0.4 ml. of N,N-dimethylaniline were added to the solution. A strong evolution of HCl immediately took place. The HCl gas was flushed out of the reaction mixture with nitrogen. The reaction had ended after about 18 to 24 hours. The toluene was then distilled off and the end product was recrystallized from toluene. Acetic ester was also suitable for use in the recrystallization. The yield amounted to over 90%. M.P. 94–96° C.

*Analysis.*—Found (percent): Si, 2.8. Theory (percent): Si, 2.9.

EXAMPLE 5

Diphenyl-di-(pentachlorophenoxy)-silane 53.3 g. of pentachlorophenol were dissolved in 250 ml. of toluene at 110° C. in a three necked flask equipped with a condenser, agitator and a tube for the introduction of nitrogen. Then 25.3 g. of diphenyldichlorosilane and 0.6 ml. of N,N-dimethylaniline were added. Immediately an intense evolution of HCl took place. The HCl gas was flushed out of the reaction mixture with nitrogen. The reaction had ended after about 12 hours. The product was recrystallized from toluene. The yield was over 90%. M.P. 202–205° C.

*Analysis.*—Found (percent): C, 40.21; H, 1.4; Cl, 49.8; Si, 4.2. Theory (percent): C, 40.4; H, 1.4; Cl, 49.8; Si, 3.93.

EXAMPLE 6

Dimethyl-di-(pentachlorophenoxy)-silane

In a three necked flask equipped with a condenser, agitator and a tube for the introduction of nitrogen, 53.3 g. of pentachlorophenol were dissolved in 250 ml. of toluene at 110° C. Thereafter 12.9 g. (0.1 mol) of dimethyldichlorosilane and 0.6 ml. of N,N-dimethylaniline were added to the solution. Immediately an intense evolution of HCl took place. The HCl gas was flushed out of the reaction mixture with nitrogen. The reaction ended after about 12 hours. Then the toluene was distilled off and the end product was recrystallized from toluene. The yield amounted to over 90%. The dimethyl-di-(pentachlorophenoxy)-silane had a melting point of 150–153° C.

*Analysis.*—Found (percent): C, 28.31; H, 1.01; Cl, 58.2; Si, 5.1. Theory (percent): C, 28.5; H, 1.02; Cl, 58.6; Si, 4.76.

EXAMPLE 7

Dimethyl-di-(pentafluorophenoxy)-silane

In a three necked flask equipped with a condenser, agitator and a tube for the introduction of nitrogen gas, 18.4 g. of pentafluorophenol were dissolved in 80 ml. of benzene. 6.45 g. of dimethyldichlorosilane and 0.4 ml. of N,N-dimethylaniline were then added. Immediately an intense evolution of HCl set in. The HCl gas was flushed out of the reaction mixture with nitrogen. The reaction ended after about 4 hours. The benzene was then drawn off.

The end product was distilled off as a colorless liquid at 109–110° C. (0.6 mm. Hg) $n_{20}{}^D$: 1.4366.

EXAMPLE 8

Vinyl-tri-(2,4,6-tribromophenoxy)-silane

In a three necked flask equipped with a condenser, agitator and tube for the introduction of nitrogen, 99.3 g. (0.3 mol) of 2,4,6-tribromophenol were dissolved in 300 ml. of benzene at 80° C., and then 16.15 g. (0.1 mol) of vinyl trichlorosilane and 0.4 ml. of tri-n-butylamine were added. A strong evolution of HCl began at once. The HCl gas was flushed out of the reaction mixture with dry nitrogen. The reaction was ended after about 8 hours. The benzene was then removed and the end product was recrystallized from toluene. The yield was approximately 90%. M.P. 139–140° C.

*Analysis.*—Found (percent): C, 23.19; H, 0.9; Si, 2.9; Br, 69.0. Theory (percent): C, 23.01; H, 0.81; Si, 2.68; Br, 68.9.

EXAMPLE 9

Dimethyl-di-(pentabromophenoxy)-silane

In a three necked flask equipped with a condenser, agitator and tube for the introduction of nitrogen, 48.8 grams (0.1 mol) of pentabromophenol were dissolved in 250 ml. of benzene at 80° C., and then 6.45 g. (0.05 mol) of dimethyldichlorosilane and 0.5 g. of N-phenylmorpholine were added to the solution. A strong evolution of HCl immediately took place. The HCl gas was flushed out of the reaction mixture with dry nitrogen. The reaction ended after about 8 hours. The benzene was then drawn off and the end product was recrystallized from toluene. The yield amounted to approximately 90%. M.P. 175° C.

*Analysis.*—Found (percent): C, 16.24; H, 0.57; Si, 2.6; Br, 77.4. Theory (percent): C, 16.2; H, 0.58; Si, 2.71; Br, 77.2.

EXAMPLE 10

Methyl-tert.-butoxy-di-(pentachlorophenoxy)silane

In the same manner as in Example 9, 17.5 g. (0.1 mol) of methyl-tert.-butoxydichlorosilane and 53.3 g. (0.2 mol) of pentachlorophenol were brought to reaction in 250 ml. of toluene using 0.5 g. of N,N'-dimethylpiperazine as the catalyst. A colorless, solid product was obtained in a yield of about 85%. M.P. 155–157° C. (recrystallized from toluene).

*Analysis.*—Found (percent): C, 31.77; H, 1.97; Cl, 54.5; Si, 4.2. Theory (percent): C, 31.7; H, 1.86; Cl, 55.1; Si, 4.35.

EXAMPLE 11

Methyl-tert.-butoxy-di-(pentachlorophenoxy)-silane

Following the procedure described in Example 10, 17.5 g. (0.1 mol) of methyl-tert.-butoxy-dichlorosilane and 53.3 g. (0.2 mol) of pentachlorphenol were brought to reaction in 250 ml. of toluene using 0.5 g. of N-benzyl-dimethylamine as the catalyst. A colorless, solid product was obtained in a yield of about 85%. M.P. 155–157° C. (recrystallized from toluene).

*Analysis.*—Found (percent): C, 31.77; H, 1.97; Cl, 54.5; Si, 4.2. Theory (percent): C, 31.7; H, 1.86; Cl, 55.1; Si, 4.35.

EXAMPLE 12

Vinyl-tri-(pentachlorophenoxy)-silane

In a manner analogous to that of Example 8, 80 g. (0.3 mol) of pentachlorophenol was reacted with 16.15 g. (0.1 mol) of vinyltrichlorosilane, using 0.5 ml. of tri-n-butylamine as a catalyst. The product was obtained in a 90% yield and had a melting point of 187° C.

EXAMPLE 13

Dimethyl-di-(pentachlorophenoxy)-silane

In a three necked flask equipped with stirrer, reflux condenser and introduction tube, 26.65 g. of pentachlorophenol (0.1 mol), 6.45 g. of dimethyldichlorosilane (0.05 mol) and 0.5 ml. of tributylamine, dissolved in 125 ml. of benzene, were brought to reaction at 65° C.

After 5 hours, 50% of the hydrogen chloride had been evolved. Thereafter the reaction mixture was kept at the boiling temperature of the benzene. 23 hours later, 90% of the HCl had been split off.

A similar reaction mixture, but not including the catalyst was brought to reaction under the same conditions, for the purpose of comparison. After 23 hours of reaction time, only 47% of the hydrogen chloride had been evolved.

EXAMPLE 14

Diphenyl-di-(pentachlorophenoxy)-silane

In a three necked flask provided with reflux condenser, stirrer and nitrogen gas introduction tube, 26.65 g. (0.1 mol) of pentachlorophenol were dissolved in 120 ml. of xylene at 140° C., 12.66 g. (0.06 mol) of diphenyldichlorosilane and 0.5 ml. of formamide were then added to the resulting solution. A strong evolution of HCl immediately set in. The HCl gas was flushed out of the reaction mixture with $N_2$. After 22 hours, 80% of the theoretical HCl had been split off. The diphenyl-di-(pentachlorophenoxy)-silane precipitated upon cooling and had a melting point of 190° C. to 193° C. Yield: 90%.

EXAMPLE 15

Diphenyl-di-(pentachlorophenoxy)-silane

In a three necked flask provided with a reflux condenser, stirrer and $N_2$ introduction tube, 26.65 g. (1 mol) of pentachlorophenol were dissolved in 120 ml. of o-dichlorobenzene at 140° C., and 12.66 g. (0.06 mol) of diphenyldichlorosilane and 0.5 g. of N,N-di-p-tolylcarbodiimide were then introduced into this solution. A strong evolving of HCl immediately started. The HCl gas was flushed out of the reaction medium with $N_2$. After 15 hours the reaction was completed. The product precipitated upon cooling and had a melting point of 192° C. Yield: about 87%.

EXAMPLE 16

Diphenyl-di-(2,4,6-tribromophenoxy)-silane

In a three necked flask provided with a reflux condenser, stirrer and $N_2$ introduction tube, 66.24 g. of 2,4,6-tribromophenol (0.2 mol) were dissolved at 200° C. in 150 ml. of o-dichlorobenzene. 25.32 g. (0.1 mol) of diphenyldichlorosilane and 0.5 g. of di-p-tolylcarbodiimide were then added to the resulting solution. Immediately a strong evolving of HCl took place. The HCl gas was flushed out of the reaction medium with $N_2$. 23 hours later, 92% of the theoretical HCl had been released. The o-dichlorobenzene was removed by distillation under a vacuum. The residue had a melting point of 152° C.–162° C. and was recrystallized out of cyclohexane. The crystalline diphenyl-di-(2,4,6 - tribromophenoxy) - silane had a melting point of 172 to 173° C. Yield: 85%.

EXAMPLE 17

Phenyl-tri-(2,4-trichlorophenoxy)-silane

In a three necked flask provided with reflux condenser, stirrer and $N_2$ introduction tube, 59.25 g. (0.3 mol) of 2,4,6-trichlorophenol were dissolved at 180° C. in 150 ml. of o-dichlorobenzene, and 21.15 g. (0.1 mol) of phenyltrichlorosilane and 0.5 ml. of dibutylbenzoic acid amide were then added to the resulting solution. A strong production of HCl immediately took place. The HCl gas was flushed out of the reaction medium with $N_2$. 23 hours later the reaction was completed. The o-dichlorobenzene was removed by vacuum distillation. The residue had a melting point of 102–108° C. It was recrystallized out of ethyl acetate and had a melting point of 115–118° C. Yield: 90%.

I claim:

1. A process for the preparation of a halogenated phenoxysilane of the formula:

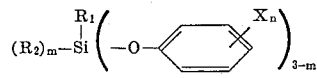

wherein $R_1$ represents a member selected from the group consisting of alkenyl, alkyl, cycloalkyl and aryl, $R_2$ represents a member selected from the group consisting of alkyl, cycloalkyl, aryl, alkoxy and aryloxy, X represents a member selected from the group consisting of fluorine, chlorine and bromine $n$ is a whole number of from 1 to 5, and $m$ represents a number of from 0 to 1, which comprises condensing at a temperature of from 40 to 250° C. a halogenated phenol of the formula:

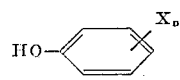

with a halogen silane of the formula:

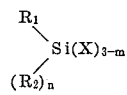

wherein $R_1$, $R_2$, X, $n$ and $m$ are as above defined, in the presence of at least one member selected from the group consisting of tertiary amines, tertiary amines the amino group of which forms part of an aromatic ring system, unsubstituted and N-mono- and disubstituted acid amides and hydrochlorides thereof.

2. Process according to claim 1 which comprises effecting said condensation at a temperature of from 55 to 180° C.

3. Process according to claim 1 which comprises effecting said condensation in the presence of a solvent.

4. Process according to claim 1 which comprises utilizing said catalyst in an amount of from 0.1 to 20 mol percent referred to said halogen silane.

5. Process according to claim 1 which comprises utilizing said catalyst in an amount of from 0.1 to 2 mol percent referred to said halogen silane.

6. Process according to claim 1 wherein said tertiary amine is an aliphatic aromatic amine.

7. Process according to claim 6 wherein said tertiary amine is p-bromophenyldimethylamine.

8. Process according to claim 6 wherein said tertiary amine is N,N-dimethylaniline.

9. Process according to claim 1 which comprises effecting said condensation using said halogen silane and halogenated phenol in a stoichiometric ratio.

10. Process according to claim 1 which comprises effecting said condensation using an excess of phenolic compound.

11. Process according to claim 1 wherein said catalyst is a tertiary amine, the amino group of which forms part of an aromatic ring system.

12. Process according to claim 1 wherein said catalyst is an acid amide.

13. Process according to claim 12 wherein said acid amide is a carbodiimide.

14. Process according to claim 12 wherein said amide is an N-substituted amide having aliphatic radicals containing 2 to 5 carbon atoms.

15. Process according to claim 1 wherein said catalyst is a member selected from the group consisting of tertiary amines, the amino group of which forms part of an aromatic ring system, unsubstituted acid amides, N-mono- and disubstituted acid amides and the quaternary ammonium compounds thereof.

16. Process according to claim 1 wherein said catalyst is formamide.

17. Process according to claim 1 wherein said catalyst is N,N-di-p-tolyl-carbodiimide.

18. Process according to claim 1 wherein said catalyst is dibutylbenzoic acid amide.

References Cited

"Chemical Abstracts," 55, p. 9314, 1960.
Speier, "G.A.C.S.," 74, February 1952, p. 1005.

TOBIAS E. LEVOW, Primary Examiner

P. F. SHAVER, Assistant Examiner

U.S. Cl. X.R.
260—448.8

UNITED STATES PATENT OFFICE
CERTIFICATE OF CORRECTION

Patent No. 3,546,267  Dated Dec. 8, 1970

Inventor(s) Roshy M. Ismail

It is certified that error appears in the above-identified patent and that said Letters Patent are hereby corrected as shown below:

Col. 2, line 18, change "half" to --halt--;

Col. 4, line 30, insert a comma after "N-phenyltetrahydroqunioline".

Col. 9, line 60, (claim 1, line 14), insert a comma after "bromine".

Col. 10, line 43, (claim 14, line 1,) after "said" insert --acid--.

Signed and sealed this 11th day of January 1972.

(SEAL)
Attest:

EDWARD M. FLETCHER, JR.
Attesting Officer

ROBERT GOTTSCHALK
Acting Commissioner of Pa